US011797701B1

(12) United States Patent
Angelo et al.

(10) Patent No.: US 11,797,701 B1
(45) Date of Patent: Oct. 24, 2023

(54) SECURE DATA COLLABORATION

(71) Applicant: OneIQ Corp., Kitchener (CA)

(72) Inventors: Mark Angelo, Haifa (IL); Oleg Grodzevich, Waterloo (CA)

(73) Assignee: OneIQ Corp., Kitchener (CA)

( * ) Notice: Subject to any disclaimer, the term of this patent is extended or adjusted under 35 U.S.C. 154(b) by 53 days.

(21) Appl. No.: 17/164,460

(22) Filed: Feb. 1, 2021

(51) Int. Cl.
| | |
|---|---|
| *G06F 21/00* | (2013.01) |
| *G06F 21/62* | (2013.01) |
| *G06F 21/33* | (2013.01) |
| *G06F 16/2458* | (2019.01) |
| *G06F 16/28* | (2019.01) |
| *G06F 16/26* | (2019.01) |

(52) U.S. Cl.
CPC ...... *G06F 21/6218* (2013.01); *G06F 16/2477* (2019.01); *G06F 16/26* (2019.01); *G06F 16/283* (2019.01); *G06F 21/335* (2013.01); *G06F 2221/2141* (2013.01)

(58) Field of Classification Search
CPC .. G06F 21/6218; G06F 21/2477; G06F 16/26; G06F 16/283; G06F 21/335; G06F 2221/2141
See application file for complete search history.

(56) References Cited

U.S. PATENT DOCUMENTS

| | | | | |
|---|---|---|---|---|
| 10,114,964 | B2* | 10/2018 | Ramesh | G06F 21/6218 |
| 10,503,822 | B1* | 12/2019 | Spencer | G06F 40/197 |
| 2007/0143398 | A1* | 6/2007 | Graham | G06Q 40/02 |
| | | | | 709/204 |
| 2016/0142399 | A1* | 5/2016 | Pace | H04L 63/0815 |
| | | | | 726/4 |
| 2018/0107832 | A1* | 4/2018 | Ouyang | G06F 16/21 |
| 2021/0176216 | A1* | 6/2021 | Yorga | H04L 65/1069 |
| 2021/0218742 | A1* | 7/2021 | Cook | H04L 63/0815 |
| 2022/0200997 | A1* | 6/2022 | Chan | G06F 21/53 |

* cited by examiner

*Primary Examiner* — Ghazal B Shehni
(74) *Attorney, Agent, or Firm* — Kent B. Chambers; Terrile, Cannatti & Chambers, LLP

(57) ABSTRACT

A secure data collaboration communication system and apparatus provides secure communication of data to multiple users of client systems to enable data collaboration. The secure data collaboration communication system and apparatus generate, share, receive, and utilize widget references to generate a common dataset. To accommodate varying levels of data access to a common dataset, in at least one embodiment, each user of the secure data collaboration communication system is associated with an access policy defining the level of data access for the user. The secure data collaboration communication system and apparatus apply the access policy to the dataset generated using the widget reference to limit exposure to data in the dataset commensurate with the user's data access level. Thus, a secure data collaboration communication system and apparatus provides a technical solution to the technical problem of providing secure collaborative data access to users having diverse levels of data access authorization.

23 Claims, 12 Drawing Sheets

SECURE DATA COLLABORATION

BACKGROUND OF THE INVENTION

Field of the Invention

The present invention relates in general to the field of data systems, and more specifically to systems and methods for secure data collaboration.

Description of The Related Art

Data conveys information on any of an almost limitless number of topics and subjects. Data collaboration allows multiple, generally dispersed users access to the same data in order to, for example, meaningfully interact with each other. In some instances, data collaboration is simply a matter of viewing the same document or concurrently accessing the same website. In these instances, the data has already been compiled and is unfiltered so that every viewer views the same data.

However, concurrently sharing data, especially confidential or other restricted data, can be problematic particularly when the viewers have varying levels of access privileges. Concurrently sharing the same data with all entities may result in either violating access restrictions or limiting data access to some entities that are otherwise authorized to see additional data.

Furthermore, data is often temporal in nature and, thus, data available from a particular source may change over time. When attempting to collaborate with temporal data, one collaborator viewing the data at particular time may be viewing different data than another collaborator viewing the data at a different time. Data can be dynamic, or in other words may change over time. Weather data, health data, system configuration data, system performance metric data represent dynamic data and can be viewed in a web page but may change over time. Thus, if one collaborator shares a uniform resource locator (URL) of a particular webpage with another collaborator residing in a different location, unless the collaborators are viewing the exact same web page with the same communications latencies at the same time, there is no guarantee that the collaborators will be viewing the same data.

Other mechanisms, such as widgets and datastores, exist for sharing data. In general, a widget is a software application that provides a specific piece of information. An electronic datastore serves various purposes and performs various data-related functions such as storing, managing, and distributing collections of data. From a collaboration perspective, all of these mechanisms can be hindered by the same type of security and temporal issues.

SUMMARY

A method, performed by a data processing system, for secure data collaboration between multiple systems includes performing, by a data processing system executing code, includes processing a computer readable widget reference and computer readable user access credentials of a first user of the first client system, wherein the widget reference includes metadata to construct a representation of a dataset and information specifying one or more representation details of the dataset. The method also includes authenticating the first user and associating the first user with a first computer readable access token, wherein the first access token is associated with an access policy that indicates access privileges of the user to the dataset and the access privileges represent at least in part an authorized exposure level of the dataset to the first user. The method also includes resolving the widget reference metadata and the access policy into a dynamic query, retrieving the dataset from data storage, wherein the dataset is responsive to the dynamic query, and limiting exposure of data in the dataset in accordance with the access policy to generate a limited exposure dataset. The method further includes generating a representation of the limited exposure of data in accordance with the one or more representation details included in the widget reference and providing the representation to the first client system of the user.

An apparatus for secure data collaboration between multiple systems includes one or more processors and a memory, coupled to the one or more processors, that stores code, wherein execution of the code by the one or more processors causes the one or more processors to perform processing a computer readable widget reference and computer readable user access credentials of a first user of the first client system, wherein the widget reference includes metadata to construct a representation of a dataset and information specifying one or more representation details of the dataset. The data processing system additionally performs authenticating the first user and associating the first user with a first computer readable access token, wherein the first access token is associated with an access policy that indicates access privileges of the user to the dataset and the access privileges represent at least in part an authorized exposure level of the dataset to the first user. The data processing system further performs resolving the widget reference metadata and the access policy into a dynamic query, retrieving the dataset from data storage, wherein the dataset is responsive to the dynamic query, and limiting exposure of data in the dataset in accordance with the access policy to generate a limited exposure dataset. The data processing system also performs generating a representation of the limited exposure of data in accordance with the one or more representation details included in the widget reference and providing the representation to the first client system of the user.

A non-transitory computer readable medium comprising code therein that when executed by one or more processors causes the one or more processors to perform processing a computer readable widget reference and computer readable user access credentials of a first user of the first client system, wherein the widget reference includes metadata to construct a representation of a dataset and information specifying one or more representation details of the dataset. The one or more processors executing the code additionally perform authenticating the first user and associating the first user with a first computer readable access token, wherein the first access token is associated with an access policy that indicates access privileges of the user to the dataset and the access privileges represent at least in part an authorized exposure level of the dataset to the first user. The one or more processors executing the code further perform resolving the widget reference metadata and the access policy into a dynamic query, retrieving the dataset from data storage, wherein the dataset is responsive to the dynamic query, and limiting exposure of data in the dataset in accordance with the access policy to generate a limited exposure dataset. The one or more processors executing the code also perform generating a representation of the limited exposure of data in accordance with the one or more representation details included in the widget reference and providing the representation to the first client system of the user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
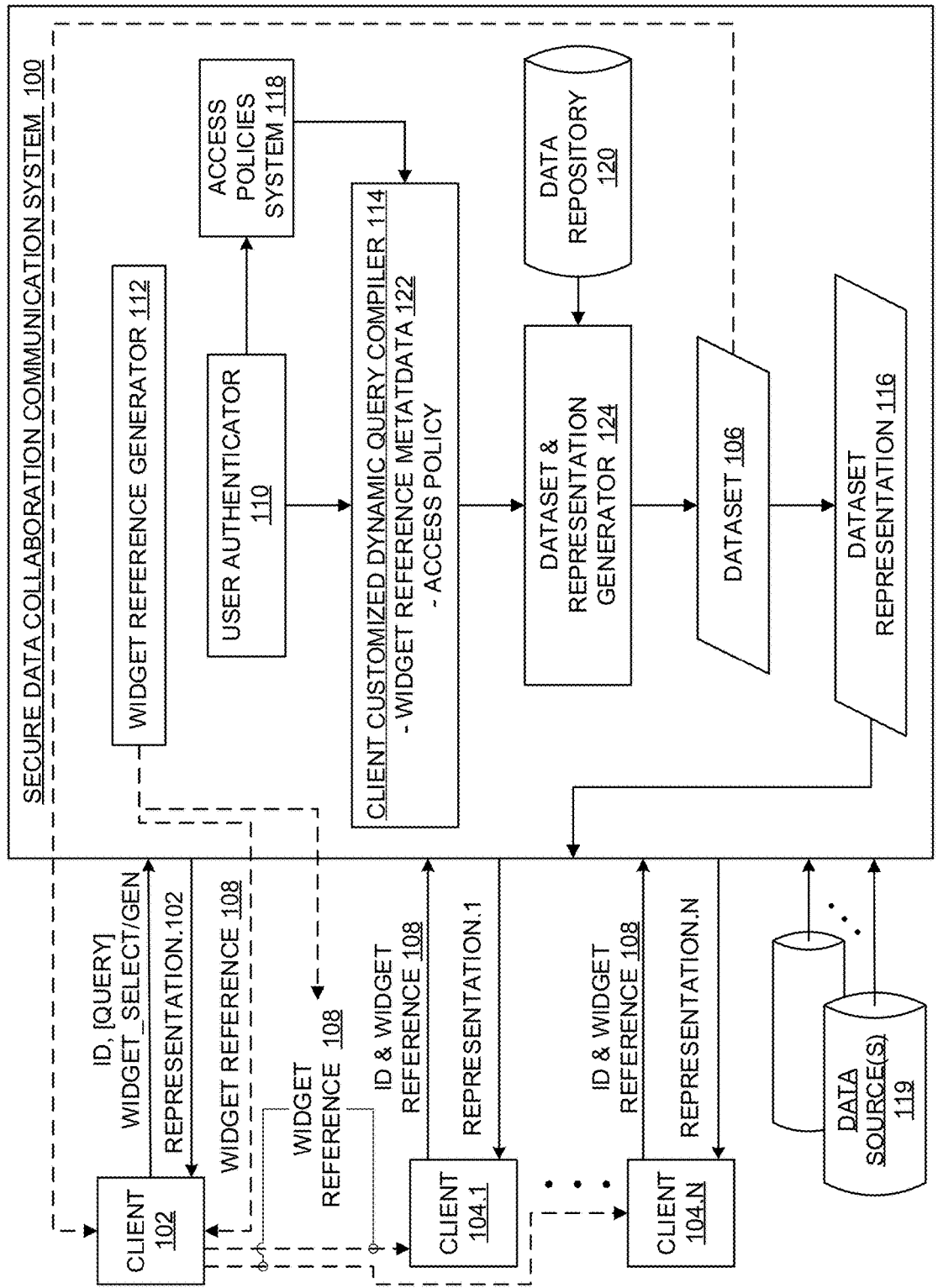
FIG. 1 depicts a secure data collaboration communication system.

A secure data collaboration communication system and method provides secure communication of data to multiple users of client systems. From a general perspective, data security involves protecting data from unauthorized access. However, unauthorized access is more granular than simply access or no access. For a given dataset, some users may have unlimited access credentials, which allows these users unrestricted views of the data. Others may have different levels of access associated with progressively more limited exposure to subsets of the data. For example, in an information technology (IT) context, an employee of a company may have unlimited access to data related to the company's IT infrastructure configuration, performance metrics, and utilization metrics. However, a first vendor may only be authorized to see the performance and utilization metrics, and a second vendor may only be allowed to see a particular component of the IT infrastructure configuration. The same concept of multiple levels of data access authorization applies to a virtually unlimited number of contexts, such as patient healthcare, human resources and background checks, and so on. Thus, providing secure collaborative data access to users having diverse levels of data access authorization represents a technical problem addressed by the secure data collaboration communication system and method.

Embodiments of the secure data collaboration communication system and method generate, share, receive, and process widget references to generate a common dataset. A widget reference includes metadata that the secure data collaboration communication system and method resolves into a dataset. Thus, the widget reference causes the secure data collaboration communication system to generate the same dataset for each user that sends the widget reference to the secure data collaboration communication system.

To accommodate varying levels of data access to a common dataset, in at least one embodiment, each user of the secure data collaboration communication system is associated with an access policy that defines the level of data access for the user. The secure data collaboration communication system and method apply the access policy to the dataset generated using the widget reference to limit exposure to data in the dataset commensurate with the user's data access level. The secure data collaboration communication system and method generate a representation of the dataset restricted in accordance with each user's access policy. In at least one embodiment, the widget reference also includes presentation information to control how the user's client system presents the representation to each user. Furthermore, in at least one embodiment, the presentation correlates with a user's data access level. The specific type and design of the representation is a matter of design choice and is, for example, a visual representation, such as a graphic, a structured language formatted document, a text file, or other type of representation.

Figure 2:
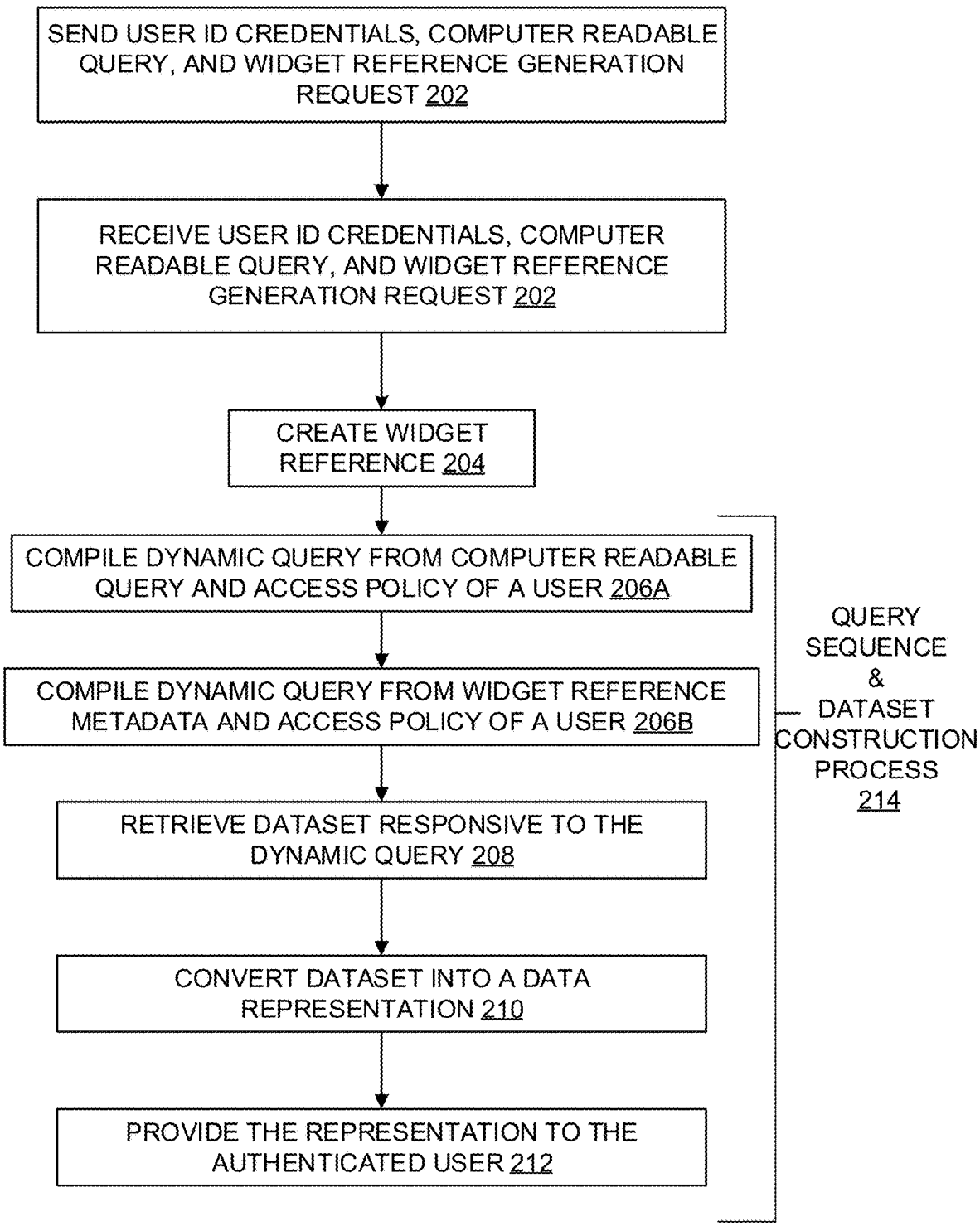
FIG. 2 depicts a secure data collaboration communication process.
Figure 3:
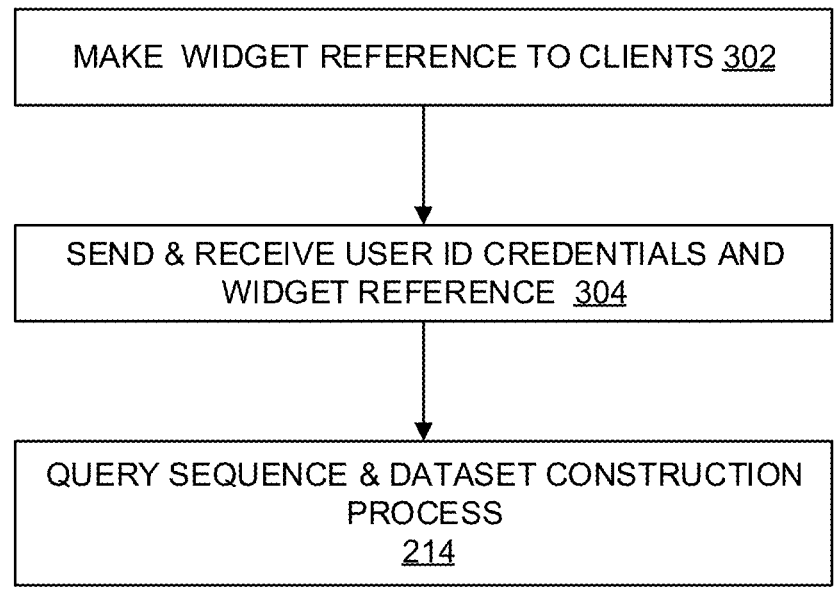
FIG. 3 depicts a secure multi-user data collaboration communication process.

FIG. 1 depicts a secure data collaboration communication system 100. FIGS. 2 and 3 depict respective secure data collaboration communication process 200 and secure multi-user data collaboration communication process 300. In at least one embodiment, the secure data collaboration communication system 100 operates in accordance with the processes 200 and 300. The secure data collaboration communication system 100 exchanges information with client systems 102 and 104.1-104.N via a communication network, such as the Internet, and N is an integer greater than or equal to 1. (The "client systems" are abbreviated as "CLIENT" in the Figures.) In operation 201, client 102 sends a computer readable query, access credentials (ID), and a widget selection/generation request to the secure data collaboration communication system 100 to begin a process of generating a dataset 106 and a widget reference 108. In operation 202, user authenticator 110 authenticates the user. The process of authenticating the user is a matter of design choice and can include, for example, verification using a username and password. Upon authentication of a user of client 102 by user authenticator 110, the user authenticator 110 associates the user of client 102 with a computer readable access token. The user is associated with an access policy that indicates data access level privileges of the user to the subsequently generated dataset 106.

In operation 204, the widget reference generator 112 constructs the widget reference 108 in response to receipt of the widget reference 108 selection/generation request. The widget reference generator 110 constructs the widget reference 108 to include widget reference metadata 122 that is resolvable by the client customized dynamic query compiler 114. The widget reference metadata 122 includes metadata that represents the computer readable query received from the client 102 so that the client customized dynamic query compiler can compile a query for client 102 and clients 104.1-104.N with the same scope as the computer readable query received from client 102 and, thus, retrieve identical datasets from data repository 120.

In at least one embodiment, the data repository 116 includes a data warehouse, which includes one or more datastores and a database that are repositories of data stored in one or multiple physical data storage systems and obtained from one or more data sources 120. In at least one embodiment, each datastore is a repository that persistently stores and manages collections of data. In at least one embodiment, a datastore includes one or more data repository types, such as databases, simple files, emails, and any simpler or more complex repository type. One or more of the datastores include temporal information associated with data in the data repository 120. In at least one embodiment, the temporal information captures time based information at various points in time across a specified time range about one or more resources. In at least one embodiment, the temporal information facilitates and supports dynamic queries that include a time range corresponding to a time range in the temporal information to facilitate retrieving an identical dataset from data storage for each of the users. The data stored in the data repository 120 can be sourced from any data source including one or more of the clients 102 and 104.1-104.N and/or data source(s) 119. Data source(s) 119 include any number of data sources that provide, for example, data streams representing real-time or near-real time data, such IT system performance metrics, cloud virtual machine instantiations, network communication flow metrics, and historical data. In at least one embodiment, the data repository 120 integrates and organizes the data from data source(s) 119.

The widget reference 108 provides part of a technological solution that enables the secure data collaboration communication system 100 to provide secure data collaboration with representations of data that are aligned with data access privileges of respective users. In at least one embodiment, the widget reference 108 facilitates construction of a user-specific dataset representation 116 based on the metadata 122 in the widget reference 108 and the user-specific access policy in the access policies 118. A widget is a software application that provides a representation of a subset of resources in the data repository 120. By providing an identical dataset, the widget can be characterized as "stable." In at least one embodiment, the resources are any resources represented in the data repository 120. For example, a subset of the resources can represent resources in an IT context, such as identification, configuration, operational metrics, and other parameters associated with an individual IT resource, an arbitrary group of IT resources, or an entire platform of IT resources.

In at least one embodiment, the widget reference 108 does not capture the dataset 106 directly. Instead, the widget reference 108 describes the dataset 106 using the metadata 122 that allows reconstruction, in accordance with the user-specific access policy, of the dataset 106 from one or more datastores in the data repository 120. Thus, the same widget reference 108 can be shared outside the secure data collaboration communication system 100 to each of clients 102 and 104.1-N and present the dataset 106 differently to each of the users of clients 102 and 104.1-N. Although the widget reference 108 is shared externally, the widget reference 108 enables generation of a stable widget that enables data collaboration while ensuring security through compliance with the data access policies, including support for time expiration when the data referenced by the widget reference 108 is outside a particular fixed or selectable time range. Accordingly, the widget reference 108 and subsequent dataset representation 116 does not expose any sensitive information but can be resolved into the resulting dataset 106 and the secure, access policy restricted dataset representation 116.

The particular widget reference metadata 122 used by operation 114 to compile a dynamic query to generate dataset 106 is a matter of design choice. In at least one embodiment, the widget metadata 122 expresses core properties and extensions, if any, which are all matters of design choice. Exemplary widget metadata includes the following core properties and supports arbitrary extensions based on the widget type:

[widget type]
[time reference: origin +range]
[time resolution]
[resource type]
[optional filter expression that selects a subset of resources]
[default representation]

As the name implies, the [widget type] represents the type of widget. Widget types are virtually limitless and include, for example, chart, metric, and report widget types. The [time reference: origin +range] refers to temporal dimensions of data represented in the widget, such as data with an origin beginning on a specific date and time and having either a range, such as a number of minutes, hours, or days from the origin, or a specific end date and time. The [time resolution] refers to the time granularity of the data, such as metric data retrieved every X seconds, every Y minutes, every Z days, and so on, where X, Y, and Z are real numbers greater than zero. The [resource type] property refers to the particular type of resource, such as servers, network nodes, patients, personnel, warehouses, vehicles, etc. The application of an access policy in constructing the dataset representation 116 provides data security consistent with the data access privileges of specific users. The [optional filter expression that selects a subset of resources] can provide further filtering, such as filter parameters based on locations, which limit resource data to resources in a particular location(s), manufacturer(s), age group, installation/activation time, etc. Exemplary extensions that can be added to the widget reference metadata 122 include:

[technology platform reference(s)]
[time range subsets]
[selective data highlighting]
[metric types]
[data categories]
[aggregation functions]

The widget reference metadata 122, thus, includes query parameters which, in at least one embodiment, are directly translatable by the client customized dynamic query compiler 114. In at least one embodiment, the properties and arguments (values) of the widget reference metadata 122 are formatted into a structured language file, such as a JSON or XML file. The client customized dynamic query compiler 114 is programmed to identify the properties and arguments of the widget reference metadata 122 and translate the widget reference metadata 122 into a compiled query as restricted by the access policy of the user.

The [default representation] property specifies how the dataset representation 116 will be presented. For example, the presentation may be a graphic, such as an image or a constructed user interface, a structured files such as a JSON or XML formatted file, a text file, a video, a presentation, or a multi-media file. In at least one embodiment, the [default representation] property can be selected from and or replaced by one more pre-designed templates. As described in more detail below, FIGS. 7-10 depict various widget presentations.

Operations 206-212 are collectively referred to as the query sequence and dataset construction process 214 and are optional for client 102. In at least one embodiment, the client 102 requests that a widget reference 108 be created by secure data collaboration communication system 100 but does not request a dataset representation 116. However, proceeding with operations 206-212 allows the user of client 102 to view the dataset representation 116 associated with the submitted computer readable query and the user's access policy to confirm that the dataset representation 116 conforms with expectations of the user.

Figure 4:
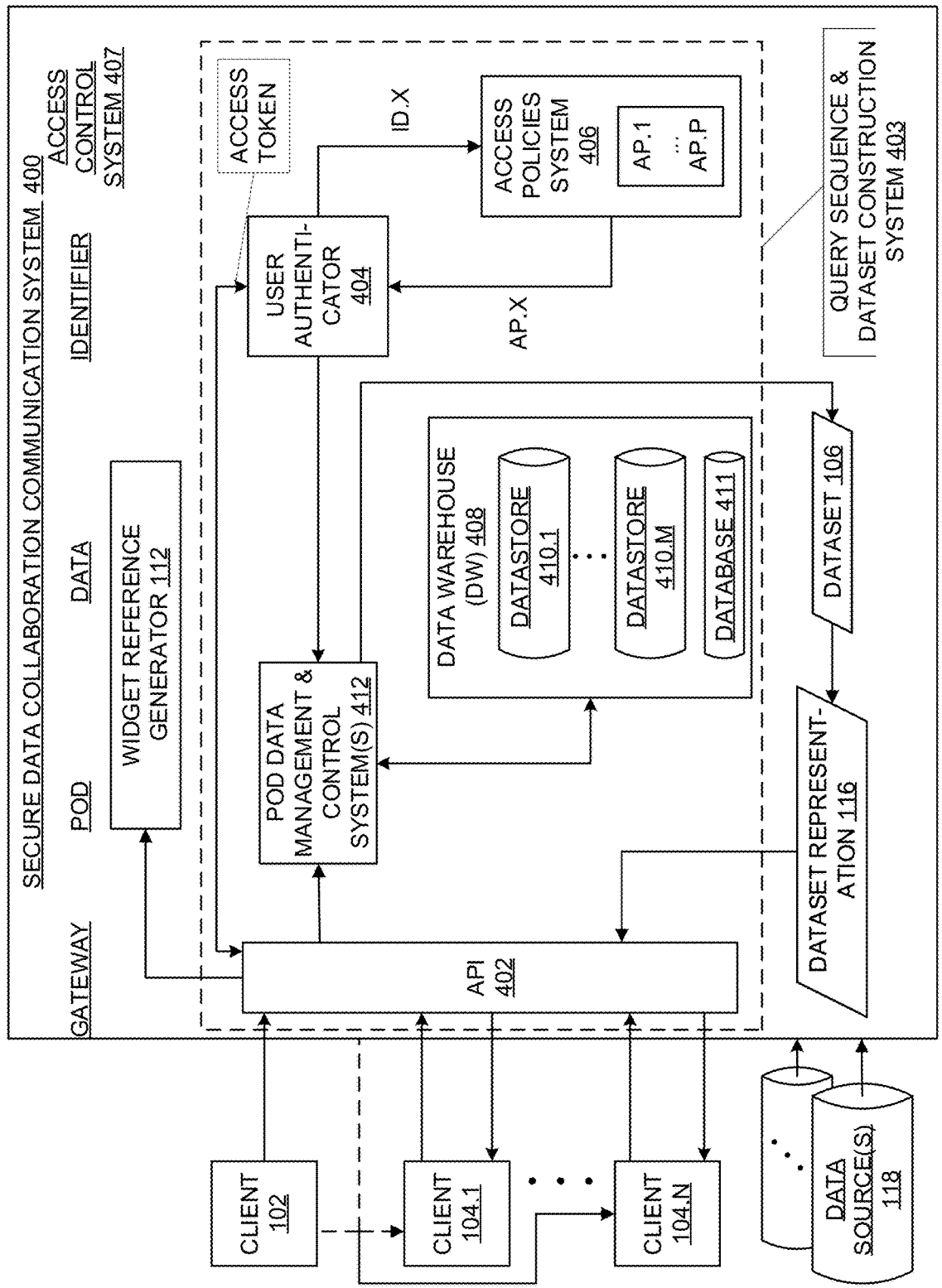
FIG. 4 depicts an embodiment of the secure data collaboration communication system of FIG. 1.

The query sequence and dataset construction process 214 includes operations 206A and 206B. In at least one embodiment, operation 206A applies to the initial compiling of a dynamic query and generation of the widget reference 108 using a query from client 102 and an access policy with reference to FIG. 1. In at least one embodiment, operation 206B applies to compiling a dynamic query from widget reference metadata and an access policy with reference to FIG. 2. In operation 206A of secure data collaboration communication process 200, client customized dynamic query compiler 114 of the query sequence and dataset construction process 214 receives an access token to authenticate the requestor before construction and retrieval of dataset 106. In at least one embodiment, the requestor is a service, such as an application programming interface (API), that makes a data request on behalf of the user or another system. As subsequently explained in more detail, in at least one embodiment, the process 214 implements a query process to authenticate an incoming data request, construct an access policy based on the requestor's credentials, locates a data management and control system that provides access and services for one or more datastores, such as datastores 410.1-410.M in the data warehouse 408 (FIG. 4). M is a positive integer index greater than or equal to one, and the data warehouse represents an embodiment of the data repository 120. The client customized dynamic query compiler 114 receives the access policy associated with the user and constructs a query commensurate with the user's computer readable query and user data access level indicated in the access policy.

In operation 208, the dataset and representation generator 124 responds to the dynamic query and retrieves dataset 106 from the data repository 120. Since the dataset generator 124 is responsive to the dynamic query, and each dynamic query reflects data access restrictions in accordance with each user's access policy. Thus, the dataset 106 contains data corresponding to the stable widget reference metadata 122 and is customized for each user to both provide data security in accordance with the user's access policy and collaboration with other users.

In operation 210, the dataset and representation generator 124 generates the dataset representation 116. The dataset representation 116 represents data from dataset 106 with limited exposure of data commensurate with the access level of the user. The process and type of limited exposure is a matter of design choice. Examples of limited exposure are obscurating certain data by, for example scrambling or opaquely masking restricted data, omitting restricted data completely from the dataset representation 116, and/or aggregating or otherwise summarizing data to restrict access to more granular supporting data. In at least one embodiment, the widget reference metadata 122 specifies a default dataset representation 116 in accordance with the [default representation] property or other user specified representation. In at least one embodiment, the representation 116 specified by the widget reference metadata 122 includes structured data fields and arguments that can be retrieved and populated by the dataset and representation generator 124 into the dataset representation 116. Any other process of including data in a file, graphic, video, or other format can be used to generate the dataset representation 116 from the dataset 106. (The phrase "dataset representation" and term "representation" are used interchangeably herein unless specifically noted otherwise.)

In operation 212, the secure data collaboration communication system 100 provides REPRESENTATION.102 to the authenticated user, which is in this instance is the user of client 102. In at least one embodiment, the REPRESENTATION.102 is constructed using a standard format or protocol such as a Joint Photographic Experts Group (JPEG) image, JSON document, or XML document, for presentation to the user of client 102.

FIG. 3 depicts a secure multi-user collaboration data communication process 300 that enables clients 104.1-104.N to collaborate on data in a data representation 116. Once secure data collaboration communication system 100 creates a widget reference 108, the widget reference 108 is sent to the clients 104.1-104.N, whose users can collaborate with any other users of clients 104.1-104.N that can select, receive, or otherwise specify the widget reference 108 and with the user of client 102. Operation 302 makes the widget reference 108 available to selected clients 102 and 104.1-104.N. In at least one embodiment, the user of client 102 provides a widget selection to the widget reference generator 112 that selects which of clients 104.1-104.N will have access to the widget reference 108. How the widget reference 108 is made available to the selected clients 104.1-104.N is a matter of design choice. In at least one embodiment, the widget reference generator 112 makes the widget reference 108 available to the clients 102 and 104.1-104.N through an internal and/or third party communication platform, such as the communication platform available from Slack Technologies, Inc. or via electronic mail (email). Utilizing a communication platform, a link, such as a uniform resource identifier (URI), to the widget reference 108 can be inserted into a communication and selectable by any recipient of the communication. The user-specific dataset representation 116 remains secure because the dataset and representation generator 124 still utilizes access policies 118 and the user authenticator 110 as part of the dataset representation 116 generation process. In at least one embodiment, the widget reference generator 112 and/or the client 102 makes the widget reference 108 available as a data file, such as a JSON file, that includes the widget reference metadata 122, and the recipient(s) of the widget reference 108 can send the widget reference 108 along with user identification information such as the ID, to the secure data collaboration communication system 100 to begin the subsequently discussed process of generating the dataset representation 116. Thus, in at least one embodiment, the client 102 and/or secure data collaboration communication system 100 makes the widget reference 108 actually or virtually available to the users of clients 104.1-104.N.

The process of sending the widget reference 108 is also a matter of design choice. In at least one embodiment, the widget reference 108 is a data file or reference to a data file that be sent via email, short messaging service (SMS}, direct message, or other data communication process.

Each client 104.1-104.N sends, and the secure data collaboration communication system 100 receives, each users' ID credentials and widget reference 108. The user authenticator 110 authenticates each of the users and associates a user-specific access policy to the user. The secure data collaboration communication system 100 then performs operation 206B to resolve the widget reference into the widget reference metadata 122 and generate a dynamic query in accordance with the metadata and the access policy of the user. The secure data collaboration communication system secure data collaboration communication system 100 then performs the query sequence and dataset construction process 214 as previously discussed to generate and send a dataset representation 116 to each of the users of client 104.1-104.N. When each of the users of clients 102 and 104.1-104.N display their custom data representation 116, the data presented by the custom data representation 116 is secure according to each user's authentication and access level, and the users can collaborate on the data presented.

FIG. 4 depicts a secure data collaboration communication system 400, which represents one embodiment of secure data collaboration communication system 100 and, in at least one embodiment, operates in accordance with secure data collaboration communication process 200 and secure multi-user data collaboration communication process 300. The secure data collaboration communication system 400 includes additional details of various components and processes. In at least one embodiment, the secure data collaboration communication system 400 is logically organized into a gateway system, data management and control system, a database system, an identifier system, and an access control system. In at least one embodiment, a POD data management and control system includes a system, sometimes referred to as a POD, that generally functions to provide access and control over the data warehouse 408 including decentralized datastores 410.1-410.M. The gateway system includes an API 402. The API 402 serves as a data communication gateway by providing a communication interface between clients 102 and 104.1-104.N and components of secure data collaboration communication system 400. In at least one embodiment, the communications between secure data collaboration communication system secure data collaboration communication system 400 and clients 102 and 104.1-104.N are identical as depicted in FIG. 1 but visually omitted in FIG. 4 for clarity.

The data warehouse (DW) 408 represents one embodiment of data repository 120. The data warehouse 408 collects data from data source(s) 119 such as multiple customer's IT environment. In at least one embodiment, the data warehouse 408 multi-tenant capabilities with various levels of isolation with the smallest isolation unit being a datastore, such as datastores 410.1-410.M.

In at least one embodiment, each datastore 410.1-410.M represents a dataset of various classes of data organized both spatially (topologically) and temporally. The classes of data assist with, for example, developing queries to filter data by class and for specifying access levels by class. A user may have different access levels for different classes. For example, a user may have a top access level 3 to configuration or inventory class data and access level 1 to measurements stored as time-based metrics. For example, datastores for an IT environment can include the following classes of data:

configuration or inventory data
measurements stored as time-based metrics
transient directed connections In at least one embodiment, the 'configuration/inventory data' class represents a state of an IT infrastructure at a specific point in time. The infrastructure may include a set of physical and virtual machines, cloud instances, networking and storage resources, their respective hardware and software configurations, names, assigned IP and MAC addresses, spatial relationships, etc. Configuration data is commonly organized in a hierarchical topology with a "platform" representing a top-level concept containing subordinate resources recursively. For example, a VMware® IT environment is represented by resources managed by VMware vCenter CMDB. (VMware is a registered trademark or trademark of VMware, Inc.). These infrastructure resources are organized into logical datacenters, containing clusters of virtual hosts with virtual machines. Virtual machines are assigned to hosts; however, this assignment can vary in time, allowing VM migration between hosts. Similarly, in a cloud environment, such as Microsoft Azure® or AWS®, virtual resources—cloud instances, storage accounts, virtual networks, etc. are organized by location, subscription and resource groups. (Microsoft Azure® and AWS® are respective registered trademarks of Microsoft Corporation and Amazon.com, Inc.) The composition of these resources, their properties, and relationships to each other can change in time leading to a temporal dimension in addition to the spatial one.

In at least one embodiment, the 'measurements stored as time-based metrics' class ("metrics class") represents metrics (measurements) collected from the environment, typically taken at a regular time interval. These metrics are normally associated with infrastructure resources being measured, where one resource can potentially have multiple metrics. For example, a machine has CPU and memory utilization, I/O, network activity, capacity metrics. A cloud resource has both usage and cost metrics across one or more technical dimensions. A temporal dimension is a natural characteristic of a metric. At the same time, temporal metrics are generally analyzed in conjunction with the associated resources' lifespan. For example, if an analysis focuses on a time reference when certain resources are not present the corresponding metrics are preferably not considered in aggregation queries.

In at least one embodiment, the 'transient directed connections' class describes relationships that are observed intermittently. A network flow between two machines represents a transient directed connection. Transient directed connections represent directional relationships, i.e., include a source machine and a target machine, and the source and target machines may have their own metrics associated with them, e.g., amount of data sent or received. Generally, like metrics a transient connection are considered when both the source and the target machines exist within a considered time range.

Different classes of data retained by the datastores 410.1-410.M can be stored in different formats and, for example, optimized for a particular class of data. In at least one embodiment, the secure data collaboration communication system 400 provides data intake and query facade services that hide data warehouse 408 implementation details, such as actual data schemas. In at least one embodiment, the API 402 provides an externally exposed, composite schema for external client 102 and/or any of 104.1-104.N specifically optimized for the consumption and analysis of data. However, the externally exposed schema may not necessarily reflect an actual storage schema. In at least one embodiment, the data warehouse 408 also utilizes a database, such a ClickHouse database (column-oriented database) for storing time-series and transient relationship data. In at least one embodiment, configuration/inventory data is stored as event streams in an "event store."

Although other formats are possible, the event-based approach for configuration/inventory data allows the data warehouse 408 to store raw collected material in a "native" schema and apply runtime transformations to convert this data into an intermediary schema that, in at least one embodiment, for operation of data warehouse services by POD data management and control system(s) 412. In at least one embodiment, the POD data management and control system(s) 412 represents the client customized dynamic query compiler 114. the intermediary schema also enables support for the temporal dimension of the configuration data, giving developers flexibility in choosing a time resolution (e.g. 1 hour) and accurate temporal ordering despite events possibly arriving out of order by, for example, when collecting data from various data source(s) 118 in parallel.

In at least one embodiment, the intermediary schema is designed to represent the infrastructure topology to be processed by analytics services. This topology is attributed with metadata further enhancing properties with the following information:

query level: attribute on the data policy—map specified visibility to properties that will be returned query category (basic, hardware, health, warranty, compliance, etc.)

indicator of referential material, e.g., identifier of the related object. Object: resources in the infrastructure topology. Looks at referential links and resolves properties in a chain of resources using one or more formulated queries.

indicator of sensitive/confidential material type of confidential material used to determine scrambling mechanism, e.g., regular name, IP address, MAC address In at least one embodiment, the secure data collaboration communication system 400 scales to an arbitrary number of datastores. In at least one embodiment, the data warehouse 408 is a distributed platform where each of datastores 410.1-410.M is assigned to a specific POD data management control system. The start here Gateway service coordinates the requests, forwarding authenticated ones to the appropriate pod, see next section for details.

The secure data collaboration communication system 400 provides a technological solution to enable users of clients 102 and 104.1-104.N to access data and collaborate with respect to the data while preserving various access levels for different users. Access policies system 40 represents one embodiment of the access policies system 118. Access levels can vary based on any number of factors, such as a user's role and licensing to access certain data. As discussed herein, various users are often granted varying access levels to data, secure data collaboration communication system 400 supports such varying access levels. The access policies AP.1 through AP.P, where P is an integer greater than one and preferably provides an access policy for each authorized user of secure data collaboration communication system 400. An access policy may have multiple different access levels for each restrictive property of an access level. For example, an ability to restrict access to data for a specified time range can set access levels to increase the specified time range as the level of access increases to potentially eliminating any restriction for one or more higher access levels. The particular restrictions and access levels are a matter of design choice and are generally context sensitive. For example, in least one embodiment, the access policies AP.1 through AP.P support the following restrictions in an IT context:

ability to restrict access to the specified time frame (temporal restriction)

ability to restrict access to the specified subset of resources (spatial restriction), e.g., to selected platforms ability to exclude certain properties or characteristics of the individual resources, e.g., exclude warranty information or health states ability to restrict access to the specified subset of metrics per resource type ability to restrict access to the aggregated queries as opposed to the individual resources at a certain level, e.g., allow analyzing clusters and hosts, but not individual virtual machines ability to restrict metrics to the specified time resolution ability to hide or scramble PII and other sensitive information, while retaining topological properties of the underlying data, e.g., scrambling IP addresses while still allowing aggregation queries over subnets In at least one embodiment, the query sequence and dataset construction system 403 performs the query sequence and dataset construction process 214. User authenticator 404 represents one embodiment of user authenticator 110, and the access policies 406 of an access control system 407 represents one embodiment of the access policies 118. User authenticator 404 authenticates incoming user requests, constructs an access policy based on the user's credentials, locates a POD servicing a corresponding datastore, and forwards the request to the client customized dynamic query compiler 408.

In at least one embodiment, a user submits an access token to API 402, which forwards the access token to the user authenticator 404. The access token can be in one of the supported formats, for example, a JSON web token (JWT) embedding user claims or an API key associated with a service principal. The user authenticator 404 validates the access token and exchanges it for a principal identity, otherwise referred to herein as an Authenticated User. The user authenticator 404 presents the Authenticated User data to the access policies system 406, which is a service responsible for tracking business information associated with entities and objects, such as users, workspaces, and licenses. The access policies system 406 constructs and responds with the access policy AP.X that, in at least one embodiment, encapsulates all requirements for data filtering and transformation for user X, such as the user of client 102 and 104.1-104.N. The data filtering and transformation refers to determining what data in data warehouse 408 should or should not be included in data representation 116 for user X limiting exposure to data by scrambling or otherwise obscuring data for which the user X can see as present but does not have an access level that allows the data to be presented in an intelligible state.

The following code represents an exemplary access policy AP.X:

```
{
  "allowed": true,
  "shouldIncludeUnscrambled": true//include scrambled data//,
  "shouldIncludeScrambled": false,
  "scramblingKey": null,
  "visibility": "scrambled",
  "realTimeOnly": false, //allows presentation of real time & historical data//
  "minTimeBoundary": "2020-11-16T17:51:32+00:00", //beginning of time range//
  "maxTimeBoundary": "2021-01-15T17:51:32+00:00", //end of time range//
  "metrics": {//access "level" and data parameters for "metrics" data//
    "automaticResolutionOnly": true,
    "level": -1,
    "depth": -1,
    "resolution": 60
  },
  "platforms": {//access "level" and data parameters for "configuration" data//
    "": {
      "maxQueryLevel": 3,
      "categories": "basic",
      "metrics": {
        "automaticResolutionOnly": true,
```

```
        "level": -1,
        "depth": -1,
        "resolution": 60
      }
    },
    "abc.platform": {//access "level" and data parameters
        for data on the abc platform//
      "maxQueryLevel": 3,
      "categories": "basic, hardware, health, warranty,
          compliance",
      "metrics": {
        "automaticResolutionOnly": true,
        "level": -1,
        "depth": -1,
        "resolution": 60
      }
    },
    "xyz.platform": {//access "level" and data parameters
        for data on the xyz platform//
      "maxQueryLevel": 3,
      "categories": "basic, hardware, health, warranty,
          compliance",
      "metrics": {
        "automaticResolutionOnly": true,
        "level": -1,
        "depth": -1,
        "resolution": 60
      }
    },
  }
}
```

Thus, the access policy AP.X enables scrambling of data to limit exposure, sets a specific time range of the data to be retrieved, and sets various access levels, with higher level numbers representing increasing levels of access. The access policy AP.X specifically grants specific level access constrained by a specified time range to metrics and categories on platforms identified as abc and xyz. The categories "basic, hardware, health, warranty, compliance" are data categories associated with specific data values in data warehouse 408.

If the user authenticator 404 authenticates the user requesting access, the gateway service API 402 sends the forwards the access policy AP.X and the original computer readable query from the user X to the POD data management and control system(s) 412. As discussed in relationship with operation 202, the POD data management and control system(s) 412 utilizes the access policy AP.X of user X and query details from the user's computer readable query data request and dynamically compiles a resulting filter and transformation on an intermediary schema. In at least one embodiment, this filter and transformation process performs at least the following tasks:

- excludes out-of-scope resources
- excludes properties outside of the allowed categories and levels
- walks referential graphs and pulls in required resources
- scrambles data attributed as confidential selecting algorithm based on the data type, for example, one-way cryptographic hash (e.g., SHA256) for unstructured entries, Crypto-PAn for IP addresses.
- injects unscrambled versions of data for automatic translation by the authorized requestors In at least one embodiment, a user's query request for data specifies a time reference (origin) instructing the dynamically compiled query on what time range to consider. In at least one embodiment, the POD data management and control system(s) 412 organize configuration data in a way that allows for efficient retrieval of a "data snapshot" from the data warehouse 408 for an arbitrary time slice. In at least one embodiment, the POD data management and control system(s) 412 achieves the efficient retrieval by maintaining a graph of immutable resources with "copy-on-write" behavior constructed from the raw events. The retrieved "data snapshot" is then processed by the above described filter and transformation plan generate a "clean" dataset 106 that can be provided to the user in accordance with the dataset representation 116 customized for the particular user in accordance with the widget reference 108.

For queries operating on the metrics and the transient directed connections classes, in at least one embodiment, the POD data management and control system(s) 412 performs processing similar to the transformation plan by compiling a dynamic SQL query plan. The dynamic SQL query plan preferably ensures the following:

- time range is restricted to the one specified in the access policy
- resources are restricted to a subset that is part of the "clean" dataset
- metrics are restricted to allowed categories and levels
- non-aggregated queries are prohibited under aggregated-only policy The POD data management and control system(s) 412 executes the query plan against a database 411 in data warehouse 408. The resulting dataset executed against the database 411 is merged with the dataset from the dynamic SQL plan to generate the dataset 106.

Figure 5:
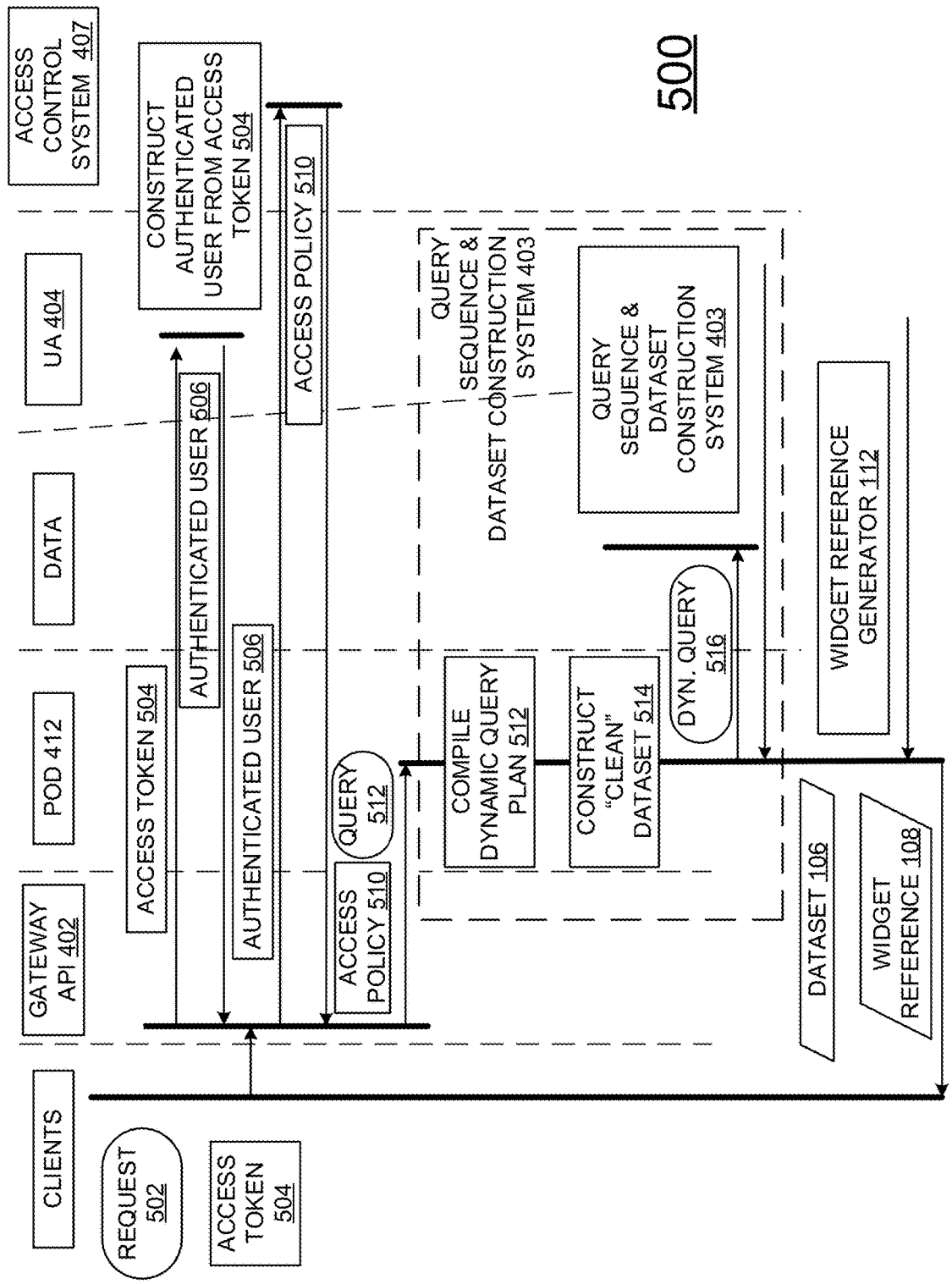
FIG. 5 depicts an exemplary secure data collaboration communication system data and processing flow.

FIG. 5 depicts an exemplary secure data collaboration communication system data and processing flow 500. The secure data collaboration communication system data and processing flow 500 provides an exemplary correlation to secure data collaboration communication system 400 and secure data collaboration communication process 200. The specific processes are as described with respect to FIGS. 1, 2, and 4. Referring to FIGS. 1, 2, 4, and 5, the request 502 represents the query and widget selection/generation request of client 102, and the access token 504 represents the ID. The gateway API 506 passes the access token 504 to the user authenticator 404, which constructs authenticated user 506 information from the access token 504. Because in at least one embodiment, the secure data collaboration communication system data and processing flow 500 represents a physically and/or logically distributed system, the gateway API 402 controls system data traffic. Thus, the authenticated user 506 information is passed to the gateway API 402, which forwards the authenticated user 506 information to the access control system 508. The access control system 508 constructs and/or retrieves the access policy 510 for the user and sends the access policy 510 to the gateway API 402. The gateway API 402 forwards the access policy 510 and the query 512 to the POD data management and control system 412 of the query sequence and dataset construction system 403. The query 512 represents the client's query included in the request 502. The query sequence and dataset construction system 403 then generates the compiled dynamic query plan 512 to construct the clean dataset 514. The dynamic query 516 retrieves any additional data in accordance with the query 512 and access policy 510, and the POD data management and control system(s) 412 construct dataset 106 generates the dataset 106. The widget reference generator 112 generates the widget reference 108, which is provided to the client 102.

Figure 6:
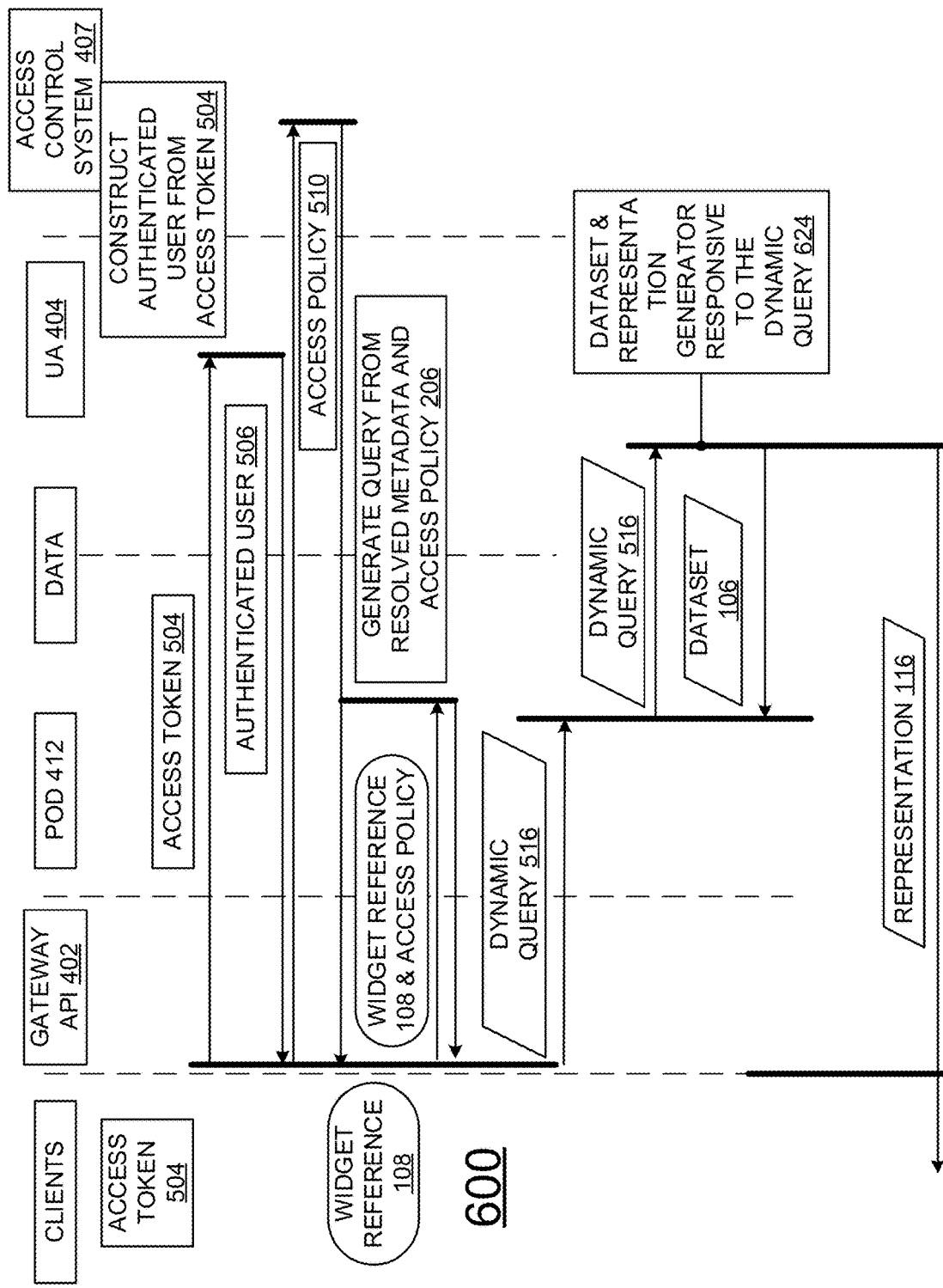
FIG. 6 depicts an exemplary secure data collaboration communication system data and processing flow from a multi-collaborator perspective.

FIG. 6 depicts an exemplary secure data collaboration communication system data and processing flow 600 from a multi-collaborator perspective. The secure data collaboration communication system data and processing flow 600 provides an exemplary correlation to secure data collaboration communication system 400 and secure data collaboration communication process 300. The specific processes are as described with respect to FIGS. 1, 3, and 4. Referring to FIGS. 1, 3, 4, and 6, clients, such as clients 102 and 104.1-104.N, each provide an access token 504 and a widget reference 108 to gateway API 402. The user is authenticated as discussed with respect to FIG. 5. The widget reference 108 is sent through the gateway API to resolve the widget reference 108 metadata and, along with the access policy of the user, generate the dynamic query. The query sequence and dataset construction system 403 constructs the dataset 106. The dataset-to-representation generator 602 constructs the representation 116 to provide to the clients.

Figure 7:
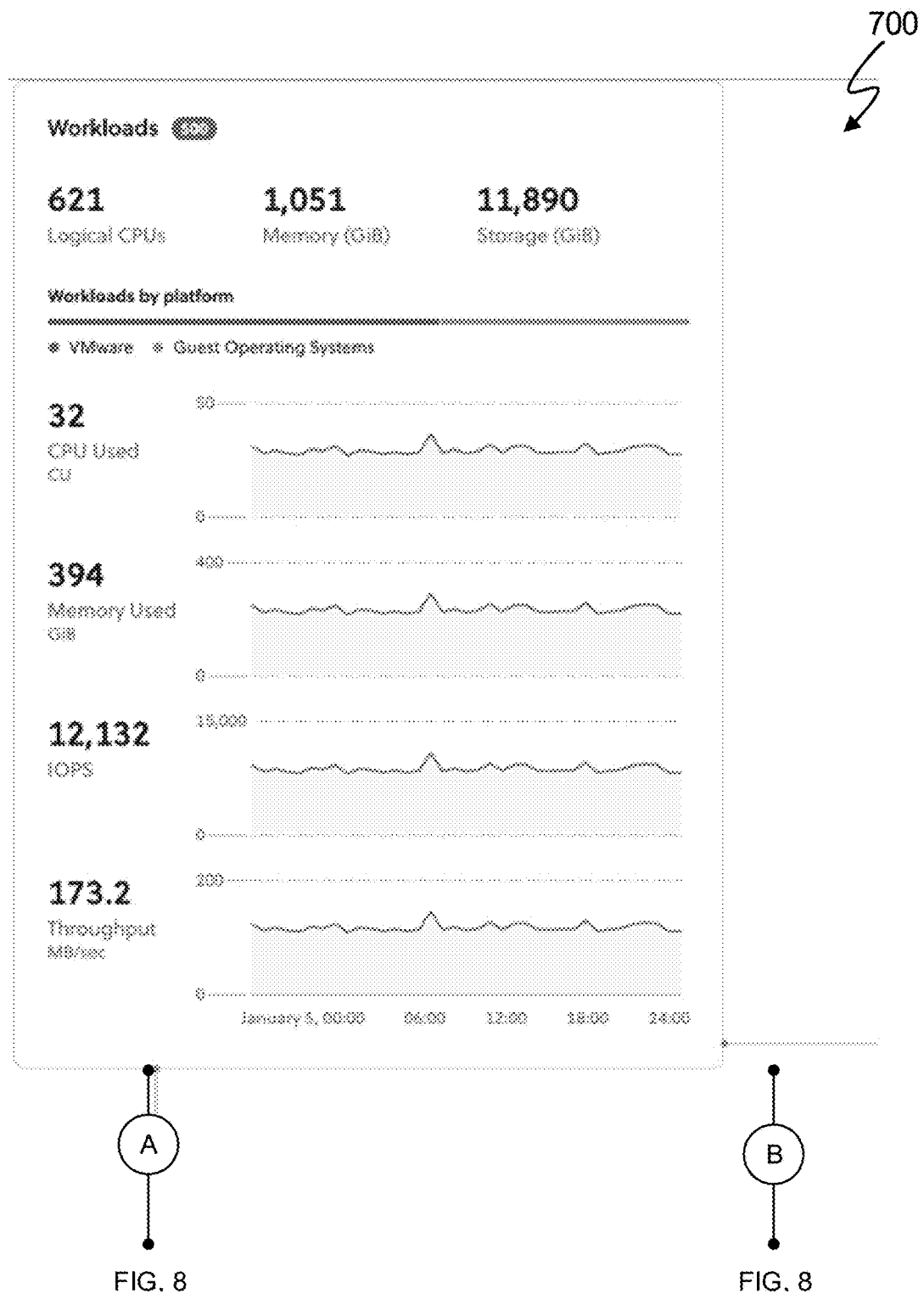
FIGS. 7-10 depict various data representations for multi-user collaboration together with access policies.

FIG. 7 depicts a representation 700 for client 102 of a dataset 106. The representation 700 reflects a high level access policy for client 102 as evidenced by the complete dataset without limited exposure.

Figure 8:
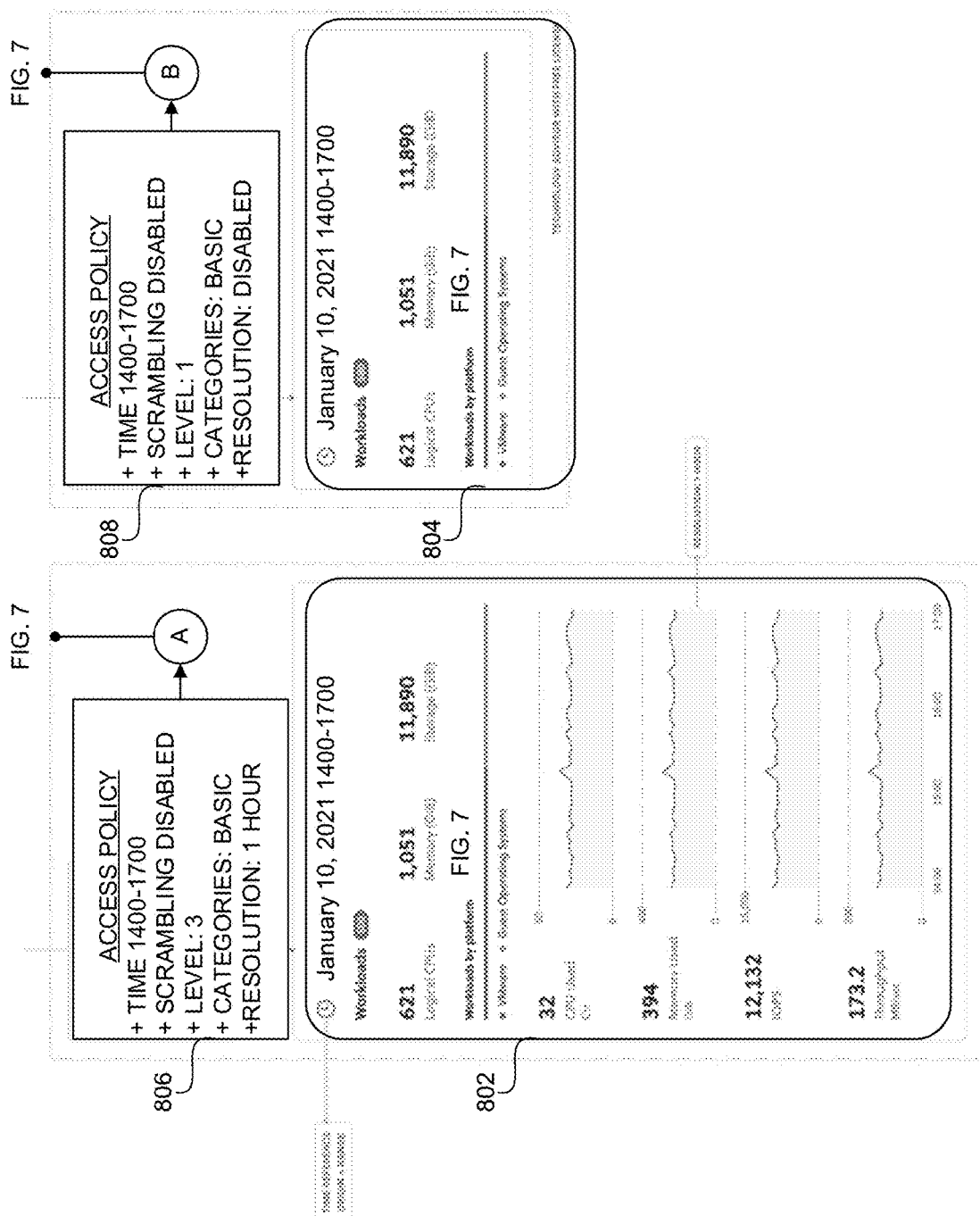

FIG. 8 depicts representations 802 and 804 corresponding to metadata encapsulated in representation 700 and respective access policies 806 and 808. The exemplary access policy 806 for client 104.1 with access level 3 allows generation of the representation 802 to present the same data as representation 700. However, the exemplary access policy 808 for client 104.2 with access level 1 limits exposure to the metrics data presented in representations 700 and 802. Nevertheless, users of clients 102, 104.1, and 104.2 are able to collaborate based on the workload metrics data presented.

Figure 9:
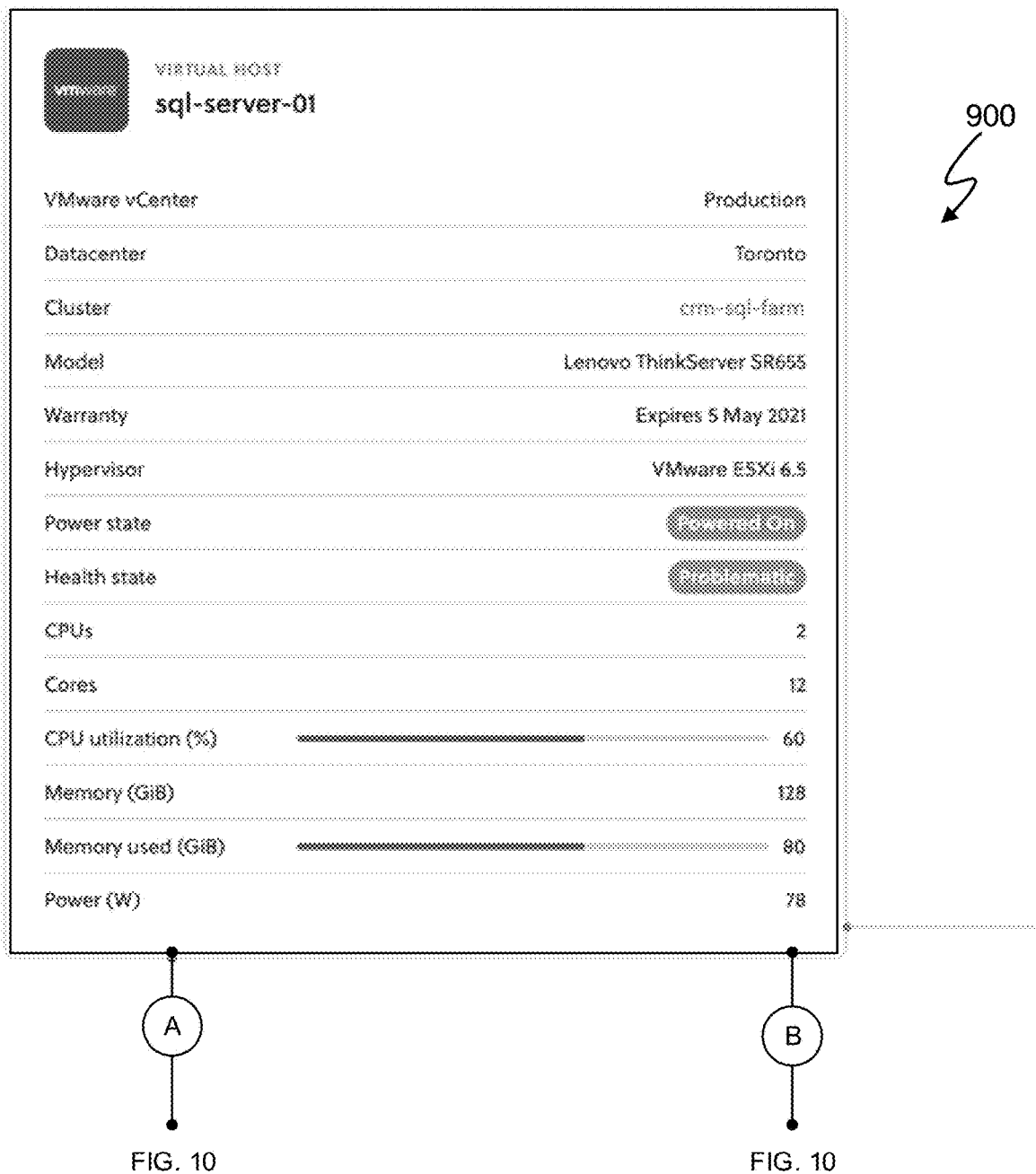

FIG. 9 depicts a representation 900 for client 102 of a dataset 106. The representation 900 reflects a high level access policy for client 102 as evidenced by the complete dataset without limited exposure.

Figure 10:
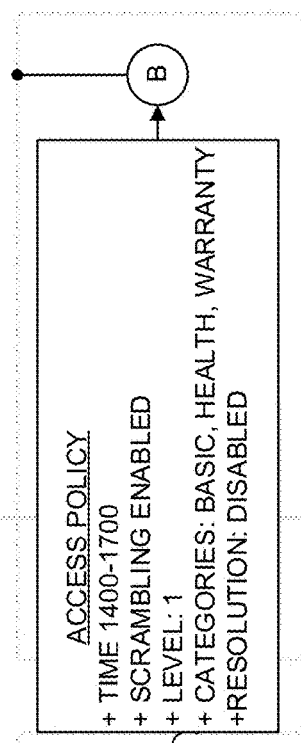
Figure 10:
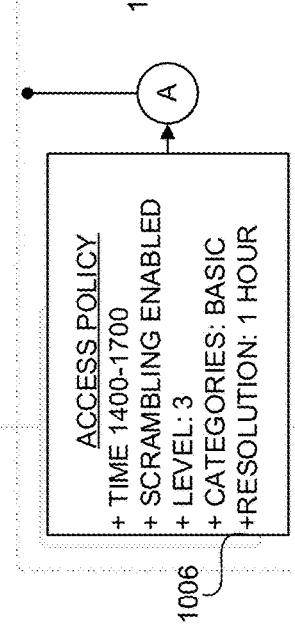

FIG. 10 depicts representations 1002 and 1004 corresponding to metadata encapsulated in representation 900 and respective access policies 1006 and 1008. The exemplary access policy 906 for client 104.1 with access level 3 allows generation of the representation 802 to present the same data as representation 700 with the exception that some data is scrambled with respect of representation 900. The exemplary access policy 808 for client 104.2 with access level 1 provides only a subset of the data in representation 1004 relative to the representation 1002. The representation 1004 also scrambles some data relative to representation 900. Nevertheless, users of clients 102, 104.1, and 104.2 are able to collaborate based on the workload metrics data presented.

Thus, a secure data collaboration communication system and method provides secure communication of data to multiple users of client systems. Embodiments of the secure data collaboration communication system and method generate, share, receive, and utilize widget references to generate a common dataset. To accommodate varying levels of data access to a common dataset, in at least one embodiment, each user of the secure data collaboration communication system is associated with an access policy that defines the level of data access for the user. The secure data collaboration communication system and method apply the access policy to the dataset generated using the widget reference to limit exposure to data in the dataset commensurate with the user's data access level. Thus, a secure data collaboration communication system and method provides a technical solution to the technical problem of providing secure collaborative data access to users having diverse levels of data access authorization.

Figure 11:
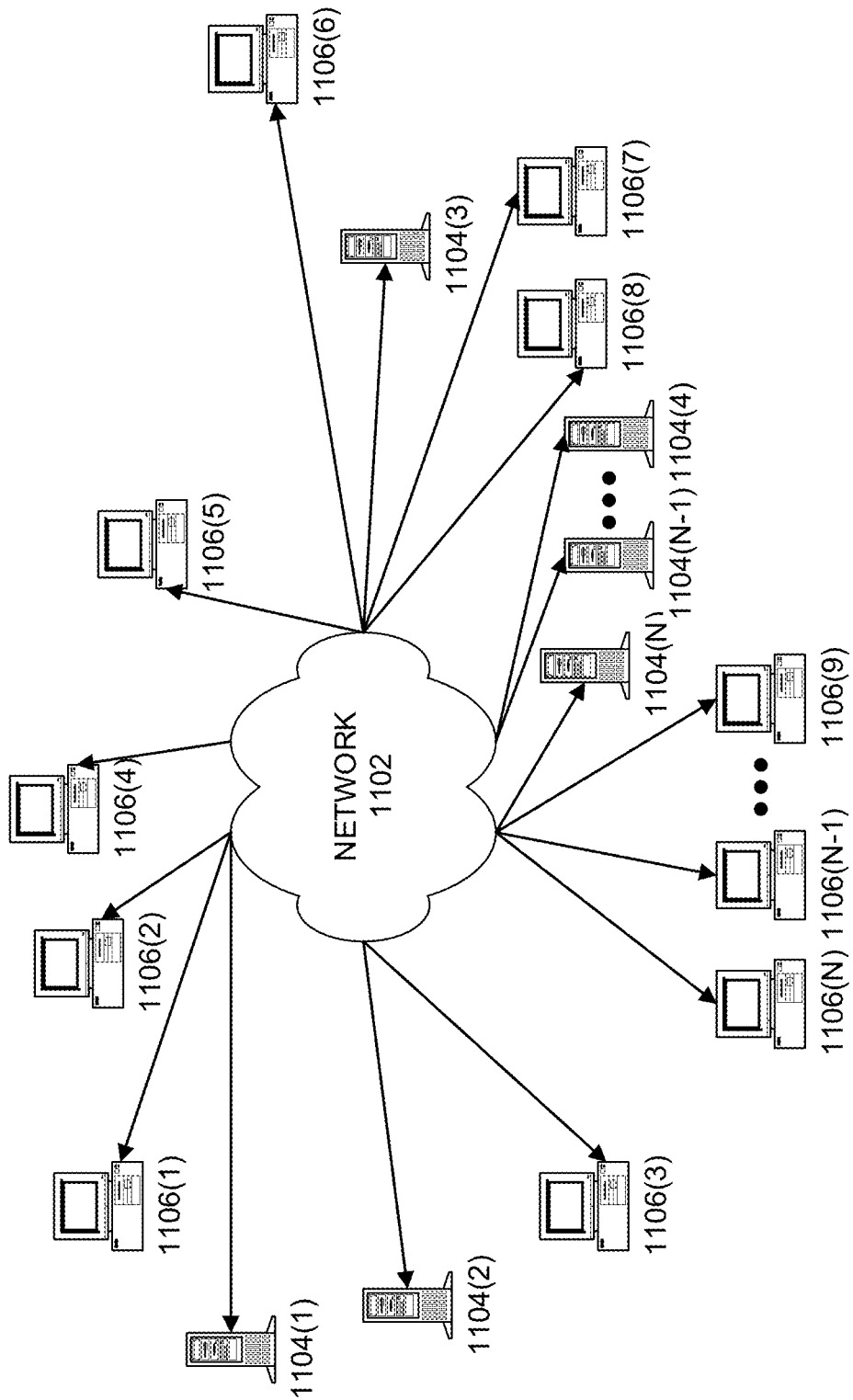
FIG. 11 depicts an exemplary network environment in which the system and method of FIGS. 1-6 may be practiced.

FIG. 11 depicts a block diagram illustrating a network environment in which a secure data collaboration communication system and method may be practiced. Network 1102 (e.g. a private wide area network (WAN) or the Internet) includes a number of networked server computer systems 1104(1)-(N) that are accessible by client computer systems 1106(1)-(N), where N is the number of server computer systems connected to the network. Communication between client computer systems 1106(1)-(N) and server computer systems 1104(1)-(N) typically occurs over a network, such as a public switched telephone network over asynchronous digital subscriber line (ADSL) telephone lines or high-bandwidth trunks, for example communications channels providing T1 or OC3 service. Client computer systems 1106(1)-(N) typically access server computer systems 1104(1)-(N) through a service provider, such as an internet service provider ("ISP") by executing application specific software, commonly referred to as a browser, on one of client computer systems 1106(1)-(N).

Client computer systems 1106(1)-(N) and/or server computer systems 1104(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the secure data collaboration communication system and method, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the secure data collaboration communication system and method can be implemented using code stored in a tangible, non-transient computer readable medium and executed by one or more processors. In at least one embodiment, the secure data collaboration communication system and method can be implemented completely in hardware using, for example, logic circuits and other circuits including field programmable gate arrays.

Figure 12:
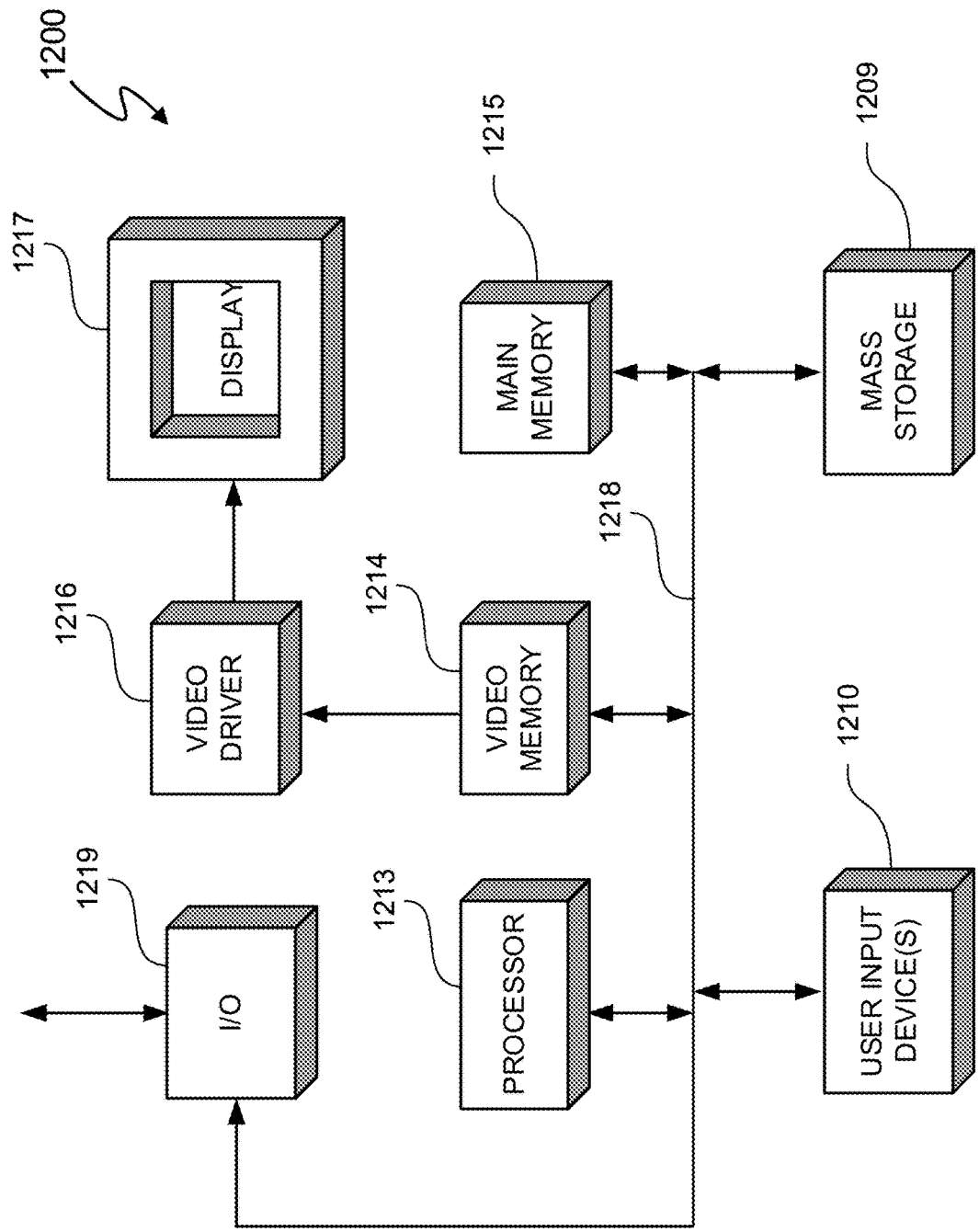
FIG. 12 depicts an exemplary computer system.

Embodiments of the secure data collaboration communication system and method can be implemented on a computer system such as a general-purpose computer 1200 illustrated in FIG. 12. The computer 1200 can be a dedicated computer system or a virtual, emulated system located in, for example, a cloud computing environment. Input user device(s) 1210, such as a keyboard and/or mouse, are coupled to a bi-directional system bus 1218. The input user device(s) 1210 are for introducing user input to the computer system and communicating that user input to processor 1213. The computer system of FIG. 12 generally also includes a non-transitory video memory 1214, non-transitory main memory 1215, and non-transitory mass storage 1209, all coupled to bi-directional system bus 1218 along with input user device(s) 1210 and processor 1213. The mass storage 1209 may include both fixed and removable media, such as a hard drive, one or more CDs or DVDs, solid state memory including flash memory, and other available mass storage technology. Bus 1218 may contain, for example, 32 of 64 address lines for addressing video memory 1214 or main memory 1215. The system bus 1218 also includes, for example, an n-bit data bus for transferring DATA between and among the components, such as CPU 1209, main memory 1215, video memory 1214 and mass storage 1209, where "n" is, for example, 32 or 64. Alternatively, multiplex data/address lines may be used instead of separate data and address lines.

I/O device(s) 1219 may provide connections to peripheral devices, such as a printer, and may also provide a direct connection to a remote server computer systems via a telephone link or to the Internet via an ISP. I/O device(s) 1219 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1209, into main memory 1215 for execution. Computer programs may also be in the form of electronic signals modulated in accordance with the computer program and data communication technology when transferred via a network. Web pages are, in at least one embodiment, created using hypertext markup language or other language compatible with one or more types of web browsers. In at least one embodiment, Java applets or any other technology is used with web pages to allow a user of a web browser to make and submit selections and allow a client computer system to capture the user selection and submit the selection data to a server computer system.

The processor 1213, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the display 1217. Video amplifier 1216 is well known in the art and may be implemented by any suitable means. This circuitry converts pixel DATA stored in video memory 1214 to a raster signal suitable for use by display 1217. Display 1217 is a type of monitor suitable for displaying graphic images.

The computer system described above is for purposes of example only. The secure data collaboration communication system and method may be implemented in any type of computer system or programming or processing environment. It is contemplated that the secure data collaboration communication system and method might be run on a stand-alone computer system, such as the one described above. The secure data collaboration communication system and method might also be run from a server computer systems system that can be accessed by a plurality of client computer systems interconnected over an intranet network. Finally, the secure data collaboration communication system and method may be run from a server computer system that is accessible to clients over the Internet.

Although embodiments have been described in detail, it should be understood that various changes, substitutions, and alterations can be made hereto without departing from the spirit and scope of the invention as defined by the appended claims.

What is claimed is:

1. A method for secure data collaboration between multiple systems, the method comprising:
 performing by a data processing system executing code:
 a) processing a computer readable widget reference and computer readable user access credentials of a first user of a first client system, wherein the widget reference includes metadata to construct a representation of a dataset and information specifying one or more representation details of the dataset;
 b) authenticating the first user;
 c) associating the first user with a first computer readable access token, wherein the first access token is associated with an access policy that indicates access privileges of the first user to the dataset and the access privileges represent at least in part an authorized exposure level of the dataset to the first user;
 d) resolving the widget reference metadata and the access policy into a dynamic query;
 e) constructing the dataset from data storage in accordance with the metadata included in the widget reference, wherein the constructed dataset is responsive to the dynamic query;
 f) retrieving the dataset from data storage;
 g) receiving the computer readable widget reference and computer readable user access credentials from a second user of a second client system;
 h) processing the computer readable widget reference and computer readable user access credentials of the second user of the second client system;
 i) authenticating the second user;
 j) associating the second user with a second computer readable access token, wherein the second access token is associated with an access policy that indicates access privileges of the second user to the dataset and the access privileges represent at least in part an authorized exposure level of the dataset to the second user;
 k) resolving the widget reference metadata and the access policy received from the second client system into a dynamic query;
 l) reconstructing the dataset from data storage in accordance with the metadata included in the widget reference received from the second client system, wherein the reconstructed dataset is responsive to the dynamic query;
 m) limiting exposure of data in the dataset to the first user in accordance with the access policy received from the first client system to generate a first limited exposure dataset;
 n) limiting exposure of data in the dataset to the second user in accordance with the access policy received from the second client system to generate a second limited exposure dataset;
 o) generating for the first user a first representation of the limited exposure of data in accordance with the one or more representation details included in the widget reference;
 p) generating for the second user the representation with the limited exposure of data in accordance with the one or more representation details included in the widget reference;

q) providing the representation of the constructed dataset to the first client system of the first user as limited by the access policy received from the first client system; and
r) providing the representation of the reconstructed dataset to the second client system of the second user as limited by the access policy received from the second client system.

2. The method of claim 1 further comprising:
performing by the data processing system:
repeating operations g)-l), n), p), and r) for multiple additional client systems and multiple additional users of the client systems, wherein the computer readable widget reference received from each of the multiple client systems is stable to reconstruct the same dataset for each of the additional multiple users and user-specific access policies limit exposure of the dataset on an access policy-by-access policy basis.

3. The method of claim 2 further comprising:
performing by the data processing system executing additional code:
providing the widget reference to each of the client systems of each of the users.

4. The method of claim 2 wherein the data storage includes temporal information associated with data in the data storage, and the dynamic query includes a time range corresponding to a time range in the temporal information to facilitate retrieving an identical dataset from data storage for each of the users.

5. The method of claim 1 wherein the data storage comprises a data warehouse, and the data warehouse comprises one or more datastores.

6. The method of claim 5 wherein data in the data warehouse is organized at least in part by data classes and each data class has class specific access and display restrictions.

7. The method of claim 1 further comprising:
performing by the data processing system:
constructing the widget reference to include the metadata that resolves to a specific query for data in the data storage that o constructs the same dataset for each user of the computer readable widget reference.

8. The method of claim 1 further comprising:
performing by the data processing system:
sending the widget reference to a first device accessible to the first user; and
sending the same widget reference to a second device accessible to the first user.

9. The method of claim 1 further comprising:
performing by the data processing system:
collecting data from multiple data sources; and
storing the data from multiple data sources in the datastore, wherein the datastore is an intermediary between the data sources and the requesting system.

10. The method of claim 1 wherein the data storage comprises a data warehouse, the data warehouse comprises one or more datastores, and at least one or more first subsets of the data stored in the one or more datastores is assigned to one or more data classes, the method further comprising:
performing by the data processing system:
limiting exposure of the data comprises at least one member of a group consisting of:
obscuring a second subset of the data, wherein obscuring the second subset of the data includes scrambling the subset of the data; and
filtering out data associated with at least one of a particular time range and the one or more data classes.

11. The method of claim 1 wherein:
the representation comprises at least one member of a group consisting of:
a visual display; and
a structured data file; and
the structured data file is structured in accordance with a data structure comprising a member of a group consisting of: JavaScript Object Notation (JSON) or Extended Markup Language (XML).

12. An apparatus for secure data collaboration between multiple systems, the apparatus comprising:
one or more processors;
a memory, coupled to the one or more processors, that stores code, wherein execution of the code by the one or more processors causes the one or more processors to perform:
a) processing a computer readable widget reference and computer readable user access credentials of a first user of a first client system, wherein the widget reference includes metadata to construct a representation of a dataset and information specifying one or more representation details of the dataset;
b) authenticating the first user;
c) associating the first user with a first computer readable access token, wherein the first access token is associated with an access policy that indicates access privileges of the user to the dataset and the access privileges represent at least in part an authorized exposure level of the dataset to the first user;
d) resolving the widget reference metadata and the access policy into a dynamic query;
e) constructing the dataset from data storage in accordance with the metadata included in the widget reference, wherein the constructed dataset is responsive to the dynamic query;
f) retrieving the dataset from data storage;
g) receiving the computer readable widget reference and computer readable user access credentials from a second user of a second client system;
h) processing the computer readable widget reference and computer readable user access credentials of the second user of the second client system;
i) authenticating the second user;
j) associating the second user with a second computer readable access token, wherein the second access token is associated with an access policy that indicates access privileges of the second user to the dataset and the access privileges represent at least in part an authorized exposure level of the dataset to the second user.
k) resolving the widget reference metadata and the access policy received from the second client system into a dynamic query;
l) reconstructing the dataset from data storage in accordance with the metadata included in the widget reference received from the second client system, wherein the reconstructed dataset is responsive to the dynamic query;
m) limiting exposure of data in the dataset to the first user in accordance with the access policy received from the first client system to generate a first limited exposure dataset;

n) limiting exposure of data in the dataset to the second user in accordance with the access policy received from the second client system to generate a second limited exposure dataset;
o) generating for the first user a first representation of the limited exposure of data in accordance with the one or more representation details included in the widget reference;
p) generating for the second user the representation with the limited exposure of data in accordance with the one or more representation details included in the widget reference;
q) providing the representation of the constructed dataset to the first client system of the first user as limited by the access policy received from the first client system; and
r) providing the representation of the reconstructed dataset to the second client system of the second user as limited by the access policy received from the second client system.

13. The apparatus of claim 12, wherein the code is further executable by the one or more processors to cause the one or more processors to further perform:
repeating operations g)-l), n), p), and r) for multiple additional client systems and multiple additional users of the client systems, wherein the computer readable widget reference received from each of the multiple client systems is stable to retrieve the same dataset for each of the additional multiple users and user-specific access policies limit exposure of the dataset on an access policy-by-access policy basis.

14. The apparatus of claim 13 wherein the code is further executable by the one or more processors to cause the one or more processors to further perform:
providing the widget reference to each of the client systems of each of the users.

15. The apparatus of claim 13 wherein the data storage includes temporal information associated with data in the data storage, and the dynamic query includes a time range corresponding to a time range in the temporal information to facilitate retrieving an identical dataset from data storage for each of the users.

16. The apparatus of claim 12 wherein the data storage comprises a data warehouse, and the data warehouse comprises one or more datastores.

17. The apparatus of claim 16 wherein data in the data warehouse is organized at least in part by data classes and each data class has class specific access and display restrictions.

18. The apparatus of claim 12 wherein the code is further executable by the one or more processors to cause the one or more processors to further perform:
constructing the widget reference to include the metadata that resolves to a specific query for data in the data storage that resolves to the same dataset for each user of the computer readable widget reference.

19. The apparatus of claim 12 wherein the code is further executable by the one or more processors to cause the one or more processors to further perform:
sending the widget reference to a device accessible to the first user.

20. The apparatus of claim 12 wherein the code is further executable by the one or more processors to cause the one or more processors to further perform:
collecting data from multiple data sources; and
storing the data from multiple data sources in the datastore, wherein the datastore is an intermediary between the data sources and the requesting system.

21. The apparatus of claim 12 wherein the data storage comprises a data warehouse, the data warehouse comprises one or more datastores, and at least one or more first subsets of the data stored in the one or more datastores is assigned to one or more data classes, wherein the code is further executable by the one or more processors to cause the one or more processors to further perform:
limiting exposure of the data comprises at least one member of a group consisting of:
obscuring a second subset of the data, wherein obscuring the second subset of the data includes scrambling the subset of the data; and
filtering out data associated with at least one of a particular time range and the one or more data classes.

22. The apparatus of claim 12 wherein:
the representation comprises at least one member of a group consisting of:
a visual display; and
a structured data file; and
the structured data file is structured in accordance with a data structure comprising a member of a group consisting of: JavaScript Object Notation (JSON) or Extended Markup Language (XML).

23. A non-transitory computer readable medium comprising code therein that when executed by one or more processors causes the one or more processors to perform:
a) processing a computer readable widget reference and computer readable user access credentials of a first user of a first client system, wherein the widget reference includes metadata to construct a representation of a dataset and information specifying one or more representation details of the dataset;
b) authenticating the first user;
c) associating the first user with a first computer readable access token, wherein the first access token is associated with an access policy that indicates access privileges of the user to the dataset and the access privileges represent at least in part an authorized exposure level of the dataset to the first user;
d) resolving the widget reference metadata and the access policy into a dynamic query;
e) constructing the dataset from data storage in accordance with the metadata included in the widget reference, wherein the constructed dataset is responsive to the dynamic query;
f) retrieving the dataset from data storage;
g) receiving the computer readable widget reference and computer readable user access credentials from a second user of a second client system;
h) processing the computer readable widget reference and computer readable user access credentials of the second user of the second client system;
i) authenticating the second user;
j) associating the second user with a second computer readable access token, wherein the second access token is associated with an access policy that indicates access privileges of the second user to the dataset and the access privileges represent at least in part an authorized exposure level of the dataset to the second user.
k) resolving the widget reference metadata and the access policy received from the second client system into a dynamic query;

l) reconstructing the dataset from data storage in accordance with the metadata included in the widget reference received from the second client system, wherein the reconstructed dataset is responsive to the dynamic query;

m) limiting exposure of data in the dataset to the first user in accordance with the access policy received from the first client system to generate a first limited exposure dataset;

n) limiting exposure of data in the dataset to the second user in accordance with the access policy received from the second client system to generate a second limited exposure dataset;

o) generating for the first user a first representation of the limited exposure of data in accordance with the one or more representation details included in the widget reference;

p) generating for the second user the representation with the limited exposure of data in accordance with the one or more representation details included in the widget reference;

q) providing the representation of the constructed dataset to the first client system of the first user as limited by the access policy received from the first client system; and r) providing the representation of the reconstructed dataset to the second client system of the second user as limited by the access policy received from the second client system.

\* \* \* \* \*